United States Patent [11] 3,588,819

[72] Inventor Shih Y. Tong
Middletown, N.J.
[21] Appl. No. 760,611
[22] Filed Sept. 18, 1968
[45] Patented June 28, 1971
[73] Assignee Bell Telephone Laboratories, Incorporated
Murray Hill, N.J.

[54] DOUBLE-CHARACTER ERASURE CORRECTING SYSTEM
12 Claims, 5 Drawing Figs.

[52] U.S. Cl. 340/146.1, 235/153
[51] Int. Cl. G08c 25/00, H04l 1/10
[50] Field of Search 340/146.1; 235/153

[56] References Cited
UNITED STATES PATENTS

| | | | |
|---|---|---|---|
| 3,439,334 | 4/1969 | Massey | 340/146.1 |
| 3,469,236 | 9/1969 | Gallager | 340/146.1 |
| 3,475,724 | 10/1969 | Townsend et al. | 340/146.1 |

OTHER REFERENCES
W. W. Peterson, ERROR-CORRECTING CODES, MIT Press and John Wiley & Sons, Inc. 1961, pp. 217—235.

*Primary Examiner*—Eugene G. Botz
*Assistant Examiner*—Charles E. Atkinson
*Attorneys*—R. J. Guenther and Kenneth B. Hamlin

ABSTRACT: Information characters of $l$-bit length are encoded in a convolution code of rate up to $(2^k-1)/2^k$, (where $2^l-1$ is an even multiple of $2^k-1$) and then transmitted over a communication channel to a receiving terminal. The received characters are processed to (1) obtain two partial syndromes $S_0$ and $S_1$ associated with the two most recently received blocks of characters, each block containing $2^l$ characters, and (2) determine character erasures, i.e., the position of errors. Determination of character erasures is done by performing signal quality checks on the characters such as null-zone detection. The two syndromes $S_0$ and $S_1$ are then utilized to correct the character erasures. Single-character erasures in any $2^l$-character block can be corrected without the requirement of a guard space. In addition, double-character erasures in any $2^l$-character block can be corrected provided the subsequent block is error free.

INVENTOR
S. Y. TONG
BY
ATTORNEY

FIG. 3C

STAGES IN DECODING RECEIVED SEQUENCE

| | DATA IN SHIFT REG. 236 | | CONTENTS OF LOCATOR WORD GEN. 252 | CONTENTS OF ERROR PATTERN WORD STORAGE 258 | ERASURE INDICATION |
|---|---|---|---|---|---|
| 1. GROUP 1 & 0 SHIFT | 000000 | 000000 | 00 | 00 | NONE |
| 2. GROUP 2 & 1 SHIFT | 100110 | 000000 | 00 | 00 | NONE |
| 3. GROUP 3 & 2 SHIFT | 000010 | 100110 | 01 | 00 | NONE |
| 4. GROUP 4 & 3 | 011010 | 000010 | 11 | 01 | ZEROTH AND FIRST CHARACTER (i.e. $u = 0$ AND $v = 1$) |
| 5. $v=1$ SHIFT OF LOCATOR WORD | | | 10 | 01 | |
| 6. ADD CONTENTS OF LOCATOR WORD GEN. TO ERROR PATTERN WORD | | | 11 | 01 | |
| 7. $v-u=1$ SHIFT OF CONTENTS OF LOCATOR WORD GEN. | | | 10 | 01 | |
| 8. ADD CONTENTS OF LOCATOR WORD GEN. TO ERROR PATTERN WORD | | | 11 | | |

DOUBLE-CHARACTER ERASURE CORRECTING SYSTEM

BACKGROUND OF THE INVENTION

1. Field of the Invention

This invention relates to data transmission and processing systems and more particularly to error detection and correction in such systems.

2. Description of the Prior Art

Decoding techniques for improving the accuracy of transmission of digital data range from simple single bit error detection schemes requiring the appending of a single bit to each data character to be transmitted (a character consists of a certain number of bits) to more elaborate schemes of error correction requiring the numerous interspersing of parity check bits among the information bits. Such schemes as the last mentioned have specifically been employed to correct a type of error known as burst-error (errors occurring in "bunches"). Burst-error, as is well known, is the most common type of digital data error occurring on telephone circuits. For this reason, considerable interest has centered on finding efficient burst-error correcting schemes.

Burst-error correcting schemes in general require a certain guard space of error-free digits between the error bursts in order to correct the erroneous digits. Of course, the longer the guard space, the less efficient is the error correcting ability of the code. One scheme which requires a relatively short guard space is disclosed in a patent application by S. Y. Tong, Ser. No. 604,226, filed Dec. 23, 1966, now U.S. Pat. No. 3,508,197, issued Apr. 21, 1970. The system disclosed in the Tong application utilizes a convolution code comprising $l$-bit length characters and having a specific rate R of up to $2^l-1/2^l$ for correcting $\leq l$ erroneous bits of any single character provided the character being corrected is a distance of at least $(1+R)/(-R)$ characters from any other character containing erroneous bits. With this scheme, the code is utilized not only to correct the erroneous character once the position of the character is determined, but also to determine the position of the erroneous character.

In some transmission environments, it is possible to determine the position of erroneous characters without utilizing the code but rather by performing signal quality checks such as null-zone detection on the received characters. When the location of an erroneous character is known but not the value of the character, this is called an erasure. If the position of the erroneous characters can be determined by some simple quality check procedure, then utilizing the code to also determine the position of the characters would be a waste of the efficiency of the code.

SUMMARY OF THE INVENTION

In view of the above described prior art systems, it is an object of this invention to provide an error-correcting system for correcting erroneous characters whose location has been determined by signal quality checking procedures.

Another object of the present invention is to provide an error-correcting system for correcting all digital errors occurring in one or two character erasures.

Still another object of this invention is to provide a system for correcting single character errors or double character erasures.

A further object of the present invention is to provide an improved burst-error correcting system.

Another object of the present invention is to provide for single character error, double character erasure and burst-error correction in an efficient and economical fashion.

These and other objects of the present invention are realized in a specific illustrative system embodiment which includes an encoder and decoder connected by a noisy channel. The encoder is of the same type mentioned in the aforecited Tong application and includes a shift register to which binary information digits are applied. A number of parity check digit circuits are connected to the various stages of the shift register for generating parity check digits having a fixed relationship with the information digits from which they are generated. The information digits are encoded in a convolution code consisting of $l$-bit characters and having a rate up to $(2^k-1)/2^k$ where $2^l-1$ is an even multiple of $2^k-1$. Groups of information characters and parity check characters are gated alternately onto the noisy channel.

At the receiving end, the received characters are processed to (1) obtain two partial syndromes $S_0$ and $S_1$ associated with the two most recently received blocks of characters, each block containing $2^l$ characters, and to (2) determine character erasures, i.e., the position of errors. Determination of character erasures as mentioned earlier, is done by performing signal quality checks on the characters such as null-zone detection. If it is determined that one erasure has occurred in a position designated as $u$ (where $u$ can range from 0 to $2^l-1$, i.e., the first character of a $2^l$-character block is actually in the $0^{th}$ position), then the erroneous character is corrected by subtracting $S_0$ (or adding $S_0$ since in the binary case, addition is the same as subtraction) from the character.

If it is determined that two character erasures have occurred and that the positions of these erasures are $u$ and $v$ where $u\leq 2^l-2$ and $v=2^l-1$ (i.e., the character in position $v$ is the parity character for the preceding $2^l-1$ characters), then it is necessary only to correct the erasure in the position $u$. This is done by subtracting the character $\beta^{1u}S_1$ from the erroneous character in the position $u$, where $\beta$ is the primitive root used to generate the original convolution code. That is, $\beta$ is a primitive element of $GF(2^k)$ where elements $GF(2^k)$ are the coefficients of the generator polynomial of the convolution code being utilized.

If it is determined that two erasures have occurred and that the positions of these erasures are $u$ and $v$ where $u<v$ $2^l-2$, then correction is accomplished by subtracting the character $e_u$, where $$e_u=\left[\sum_{j=1}^{2^{k-1}-1}\beta^{(2j-1)u-2jv}\right](\beta^v S_0+S_1)$$

from the character in the position $u$ and by subtracting the character $e_v$, where $e_v=S_0+e_u$, from the character in the position $v$. One character erasure per block of $2^l$ characters can be corrected without the requirement of a guard space and two character erasures per block of $2^l$ characters can be corrected providing that the next block of characters is error free.

With slight modification, the above described system can be utilized for burst-erasure correction. This is accomplished by interleaving the characters before transmission and separating the interleaved characters for decoding at the receiving end.

BRIEF DESCRIPTION OF THE DRAWINGS

A complete understanding of the present invention and of the above and other advantages thereof may be gained from a consideration of the following detailed description of an illustrative embodiment thereof presented hereinbelow in connection with the accompanying drawings, in which:

FIGS. 3A, 3B and 3C show illustrative data sequences as they would be encoded and decoded by the system of FIG. 2.

DETAILED DESCRIPTION

Figure 1:
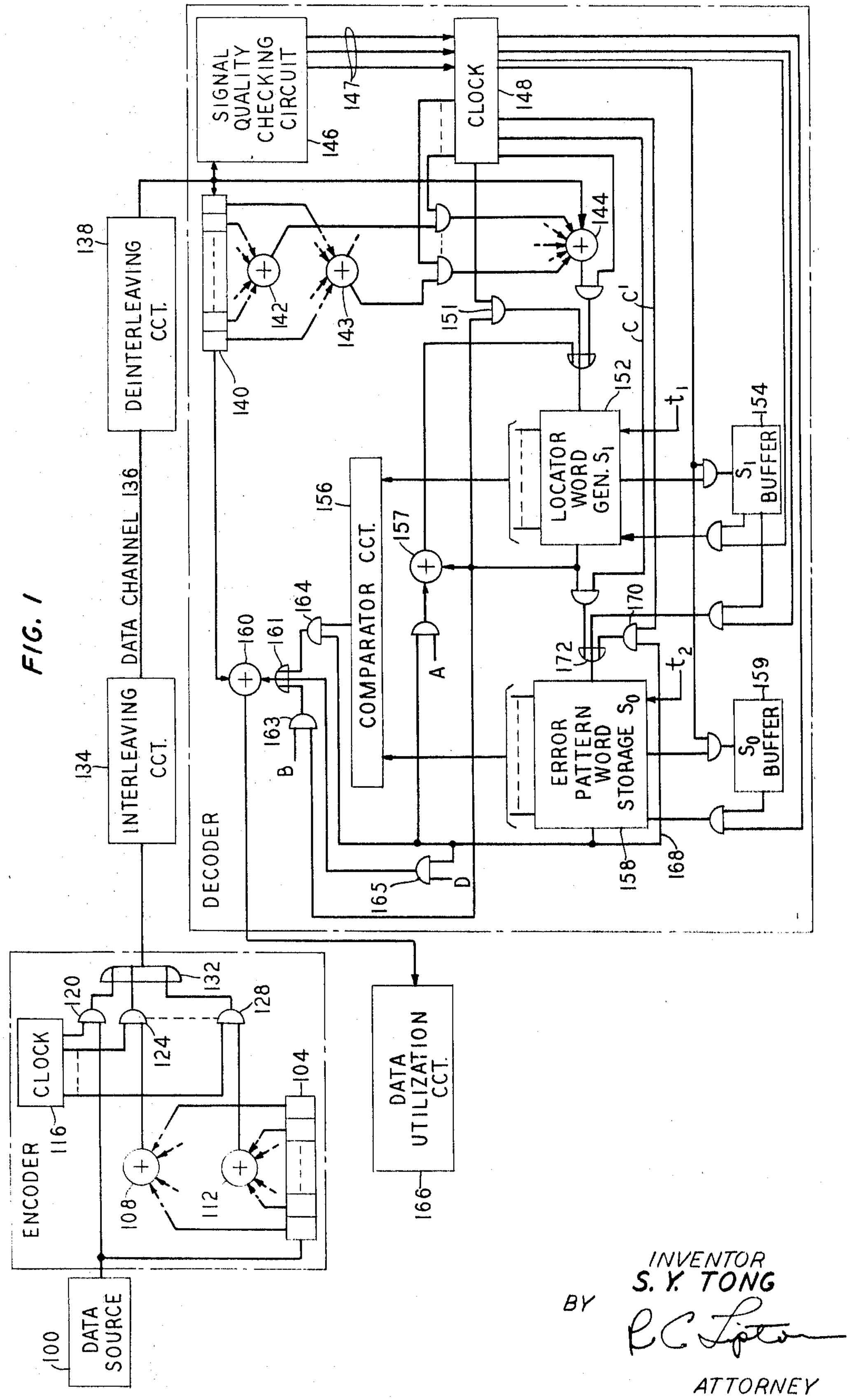
FIG. 1 shows a generalized, illustrative information processing system made in accordance with the principles of the present invention.

Before discussing the details of FIG. 1, a general description of convolution codes and a specific description of the convolution code utilized in the prior Tong application will be given.

A convolution or recurrent code may be defined as a set of digital sequences which satisfy a set of parity check equations where the parity check matrix is of the following form. (In this connection, see Wyner, A.D. and Ash, R.B., "Analysis of Recurrent Codes," IEEE Transactions on Information Theory, pages 143—150, July 1962.) Let $B_o$ be a semiinfinite matrix with $b$ columns, an infinite number of rows, and a finite number of rows, and a finite number of nonzero entries. The parity check matrix A is then formed as shown schematically below.

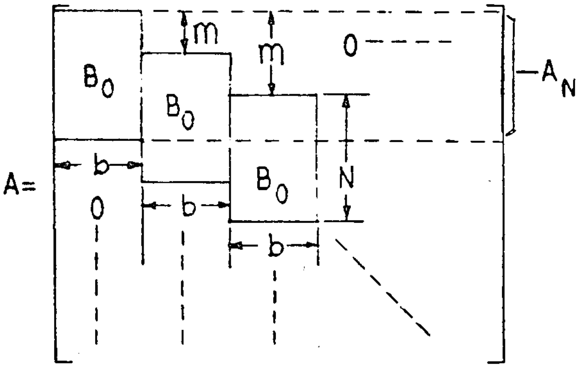

All entries of the A matrix other than the $B_o$ blocks are zeros. The parameter $b$ is determined as the smallest integer such that an N by $b$ matrix $B_o$ can generate the matrix A (i.e., if $B_o$ is specified, then A may be determined). $A_N$ is a matrix comprised of the first N rows of the matrix A and is sufficient to always reconstruct the matrix A. $A_N$ will hereafter be referred to as the "code defining" matrix. The code words of a convolution code may now be defined as semiinfinite sequences X which satisfy the equation $$A\,.\,X=0.$$

Let $x_i$ represent the $i^{th\ th}$ entry or character of the code word x. The first $m$ rows of A may through throught of as $m$ equations in the $b$ *unknowns* $X_1,...,X_b$. Assuming that the first $m$ rows of A are linearly independent, $b$-$m$ of the first $b$ characters of X may be chosen arbitrarily. Once $X_1,...,X_b$ have been chosen to satisfy the first $m$ equations, the next $m$ rows of A may be utilized as $m$ equations in the $b$ *unknowns* $x_{b+1},...,x_{2b}$. The procedure may be repeated for each block of $b$ characters; $b$-$m$ characters in each block may be chosen arbitrarily and the remaining $m$ characters are determinable from the $m$ equations (referred to hereafter as parity check equations). Thus there are $m$ check characters for every $b$ characters of X giving a redundancy of $m/b$ or a rate of $b$-$m/b$ (i.e., $b$-$m$ information characters for every $m$ parity check characters).

The present invention as well as the invention set forth in the earlier Tong application utilizes a convolution code as generally described above, each character comprising $l$ bits with $m=l$. A description of the specific convolution code employed in the prior Tong application will now be given. (The code employed in the present invention is a slight modification of this.) The code is characterized by the following $B_o$ matrix, $$B_o=\begin{bmatrix} I_1 & I_1 & \dots & I_1 & I_1 \\ \alpha^o & \alpha & \dots & \alpha^{b-2} & 0 \end{bmatrix}$$

where $I_l$ is the identity element of GF($2^1$) and $\alpha$ is a primitive element of GF($2^1$), that is, $\alpha$ is a root of an irreducible polynomial $g(x)$ such that $\alpha$ generates the elements of GF($2^1$). As can be seen from the above, the $B_o$ matrix is a 2 by $b$ character matrix or a $2l$ by $fl$ bit matrix, where $b\leq 2^1$.

The parity check matrix A is now formed as $$A=\left[\begin{array}{cc} \begin{bmatrix} I_1 & I_1 & \dots & I_1 & I_1 \\ \alpha^o & \alpha & \dots & \alpha^{b-2} & 0 \end{bmatrix} & 0 \\ 0 & \begin{bmatrix} I_1 & I_1 & \dots & I_1 & I_1 \\ \alpha^o & \alpha & \dots & \alpha^{b-2} & 0 \end{bmatrix} \end{array}\right] \Big\} A_N$$

Using the code defining matrix $A_N$ and noting the $\alpha^o=I_1$, the parity check characters may now be determined from the following equation. (A parity check character will be defined as a character which when added to the sum of a sequence of information characters gives a zero character.)

$$\begin{bmatrix} I_1 & I_1 & \dots & I_1 & I_1 & 0 & 0 & \dots & 0 \\ I_1 & & \dots & \alpha^{b-2} & 0 & I_1 & I_1 & \dots & I_1 \end{bmatrix}\cdot\begin{bmatrix} x_0 \\ x_1 \\ x_{2b-1} \end{bmatrix}=0$$

Of the characters $x_o$, $x_1 ... x_{2b11}$, $2b$—2 are to be information characters and the two remaining characters are to be parity check characters. Multiplying out the above equation gives, $$\begin{bmatrix} x_0+x_1 \dots +x_{b-1} \\ x_0+\alpha x_1+ \dots \alpha^{b-2}x_{b-2}+x_b+ \dots +x_{2b-1} \end{bmatrix}=\begin{bmatrix} 0 \\ 0 \end{bmatrix}$$

Thus $x_o+\alpha x_1+...+\alpha^{b12}x_{b12}+x_b+...+x_{2b11}=0$
or $x_{2b11}=x_o+\alpha x_1+...+\alpha^{b12}x_{b12}+x_b+...x_{2b12}$ (1)
and $x_o+x_1+...+x_{b11}=0$
or $x_{b11}=Awx_o+x_1+...x_{b12}$ (2)

where $x_{2b11}$ and $x_{b11}$ are the parity characters determined from the $2b$—2 information characters. Actually, only equation (1) need be used to determine the parity characters. At the beginning of the encoding process, $b$—1 information characters along $b$ zero characters would be used in equation (1) to obtain the first parity character. The next parity character would be obtained again using the $b$—1 information characters, along with a next group of $b$—1 information characters in equation (1). The third parity character is obtained from equation (1) using the second group of $b$—1 information characters, and a new third group of $b$—1 characters, etc. In this fashion, a parity character may be generated for every $b$—1 information characters.

The decoding of the convolution code described above is accomplished by first multiplying a received sequence of $2b$ characters by the matrix $A_N$ to obtain, $$\begin{bmatrix} I_1 & I_1 & \dots & I_1 & I_1 & 0 & 0 & \dots & 0 \\ I_1 & \alpha & \dots & \alpha^{b-2} & 0 & I_1 & I_1 & \dots & I_1 \end{bmatrix}\begin{bmatrix} y_0 \\ y_1 \\ y_{2b-1} \end{bmatrix} =\begin{bmatrix} y_0+y_1 + \dots +y_{b-1}=S_0 \\ y_0+\alpha y_1+ \dots +y_{2b-1}=S_1 \end{bmatrix} \quad (3)$$

(Of course, it is tacitly assumed that there are no errors in the previous "guard space" block of characters.)

The symbol $S_o$, which is called the error pattern word, represents the first $l$ bits of the syndrome obtained from the multiplication. The symbol $S_1$, called the locator word, represents the last $l$ bits of the syndrome. In the earlier Tong application, $S_1$ was utilized to indicate which received characters were in error and $S_o$ was utilized to indicate which bits in the erroneous characters were in error.

In the present invention, although the identical code as above could be utilized, certain advantages result if a somewhat smaller code (i.e., one having fewer code words) is used. This code is defined just as above with the exception that the primitive element $\alpha$ of GF($2^1$) is replaced by the primitive element $\beta$ of GF($2^k$) where $k$ is chosen so that $2^1-1$ is an even multiple of $2^k$—1 and $\beta=\alpha^{(2^1-1)/(2k1}1)$. GF($2^k$), in other words, is a subfield of GF($2^1$) and thus contains fewer elements (or code words). The advantage of using this smaller code in the present invention is that certain calculations in the decoding process are made simpler. This will be pointed out later.

Decoding in the present invention is as follows. If it is determined at the receiving end by some type of signal quality check that an erasure has occurred in the position $u<2$ of the $2^1$ characters being examined, then the erroneous character is corrected by subtracting (or adding) $S_O$ from the character. In other words, $S_0$ indicates which bits in the character erasure are in error and these bits are corrected by subtracting $S_0$ from this character. If it is determined that two character erasures have occurred, and that the positions of these erasures are $u \leq 2^l - 2$ and $v = 2^l - 1$ (i.e., the character in position $v$ is a parity character for the preceding $2^l - 1$ characters), then it is necessary only to correct the erasure in the position $u$. The character $\beta^{lu}S_1$ indicates the bits in error in this erroneous character and accordingly the erroneous bits are corrected by subtracting the character $\beta^{lu}S_1$ from the character in position $u$. If it is determined that two erasures have occurred and that the positions of these erasures are $u < v \leq 2^l - 2$, then correction is accomplished by subtracting the character $$e_u = \left[ \sum_{j=1}^{2^{k-1}-1} B^{(2j-1)u-2jv} \right] (B^v S_0 + S_1)$$

from the character in the position $u$, and by subtracting the character $e_v = S_0 + e_u$ from the character in the position $v$. The calculation of $e_u$ is made simpler by the choice of the subfield $GF(2^k)$ rather than the field $GF(2^l)$ since $k \leq l$.

If interleaving of characters is employed with the above described encoding and decoding processes, burst-erasure correction of high efficiency can be obtained. In particular bursts of length up to $(i-1)l+1$ bits can be corrected when interleaving of degree $i$ is employed (i.e., $i$ groups of characters at a time are interleaved) and if the interval between bursts is at least $i(2^l-1)l$ bits.

FIG. 1 shows an illustrative double-character erasure of burst-error correcting system utilizing the principles of the present invention. A description of the system of FIG. 1 will first be given assuming that no interleaving of characters is done (i.e., assuming that the interleaving circuit 134 and the deinterleaving circuit 138 are not present in the system. It is noted that the circuitry of the prior Tong application is included in the drawing along with new circuitry. This is done to indicate that either single character errors or double character errors can be corrected in the present system.

Data characters, $l$ bits long, are applied to a shift register 104 and an AND gate 120 from a source 100. With appropriate pulses from a clock 116, the gate 120 is enabled, thus transferring the data characters through an OR gate 132 to a data channel 136 which is subject to noise. Concurrent with the application of the data characters to the shift register 104, and as the data characters are being shifted into the register, one-half of the contents of the register are shifted out. The resulting contents of the shift register 104 are then added (modulo 2) by the EXCLUSIVE-OR gates 108, ..., 112 ($l$ in number) in various combinations to obtain a parity character of $l$-bit length. This character is then applied to the data channel 136 via AND gates 124 through 128 and OR gate 132. With each application of a group of data characters from the data source 100 to the shift register 104, the process is repeated. The addition of the contents of the shift register 104 to obtain the parity characters is determined according to the mathematical rules discussed earlier which, of course, requires the designation of some $\beta$ which is the primitive root of an irreducible polynomial $g(x)$ such that $\beta$ generates the elements of $GF(2^k)$.

A shift register 140 connected to the other end of the data channel 136 registers the received data characters in the right half of the register. The left half of the register contains the previously received group of data characters. Each bit of the subsequently received parity character is applied through an EXCLUSIVE-OR gate 144 where it is there added (modulo 2) to a particular output of one of the number of EXCLUSIVE-OR gates 142 through 143. These last mentioned outputs are formed by adding (modulo 2) various combinations of bits of data characters stored in the register 140. The word obtained from adding the received parity bits to the output of the EXCLUSIVE-OR gates 142 through 143, referred to as the locator word discussed earlier, is shifted into a locator word generator 152. As each bit of the locator word is shifted into the generator 152, a bit of the locator word used in the preceding decoding process and stored in a buffer 154 is shifted into an error pattern word storage register 158. This word is to be the error pattern word for the present decoding process. The functions of the locator word $S_1$ and the error pattern word $S_0$, which together make up the syndrome of the sequence currently stored in the shift register 140, were explained earlier. The words $S_1$ and $S_0$ are then applied to buffers 154 and 159 respectively (for possible future use to be explained later) as well as being retained in the units 152 and 158.

The received data and parity characters are also applied to a signal quality checking circuit 146 where the characters are checked by analog techniques to determine if any of the characters have been mutilated upon transmission. This checking merely indicates whether or not a received character is in error but not what the value of the error is, i.e., it indicates erasures. A clock 148 is then signalled over one of three leads 147 that either a single erasure has occurred, that two erasures have occurred, one of which is a data character and the other of which is a parity character, or that two erasures have occurred both of which are data characters. If a single erasure is indicated, then the decoder may proceed as described in the prior Tong application. That is, the erasure indication is not utilized by the decoder but rather if an error has occurred in any of the received characters then this error will be found utilizing the locator word of the syndrome. If, on the other hand, it were desired to utilize the erasure indication information, then the clock 148 would cause the error pattern word storage 158 to apply $S_0$ via AND gate 165 (lead D pulsed) and OR gate 161 to EXCLUSIVE-OR gate 160 just as the character which was determined as being an erasure was emerging from the shift register 140. In this manner, the erasure would be corrected and applied to a data utilization circuit 166.

If it is determined that two character erasures have occurred and that the positions of these erasures are $u < 2^l - 2$ and $v = 2^l - 1$, then it is necessary only to correct the erasure in position $u$, since position $v$ is the parity position. Under these circumstances, the signal quality checking circuit 146 applies a signal via one of leads 147 to the clock 148 indicating that an erasure has occurred in position $u$ after which the clock 148 applies $u$ shift pulses via lead $t_1$ to the locator word generator 152 causing $u$ internal shifts of the contents of the locator word generator. In other words, the internal feedback logic of the locator word generator 152 necessary for the generator of the locator word $S_1$ is utilized in this shifting to generate new contents which are equal to $\beta^{lu}S_1$. Each such internal shift of the contents of the locator word generator, in effect, causes the contents to be divided by $\beta$. This operation will be discussed in greater detail in connection with the description of FIG. 2. The contents of the locator word generator—$\beta^{lu}S_1$—is then applied via AND gate 163 (lead B is pulsed by the clock 148) and OR gate 161 to EXCLUSIVE-OR gate 160 as the $u^{th}$ character is emerging from the shift register 140. The $u^{th}$ character and $\beta^{lu}S_1$ are then added by the EXCLUSIVE-OR gate 160 (as mentioned earlier, addition is the same as subtraction in the binary case) and the result applied to the data utilization circuit 166.

If it is determined by the signal quality checking circuit 146 that two erasures have occurred in positions $u$ and $v$ where $u < v \leq 2^l - 2$, the clock 148 is signalled accordingly. The clock 148 then applies $v$ shift pulses to lead $t_1$ causing the contents of the locator word generator 152 to be internally shifted $v$ times. After this shifting, as indicated earlier, the contents of the locator word generator 152 is $\beta^{lv}S_1$. The clock 148 then applies a high to lead A, a low to lead C (and thus a high to lead C') and $l$ shift pulses to leads $t_1$ and $t_2$. This causes the contents of the error pattern word storage 158 and the locator word generator 152 to be added (modulo 2) by the EXCLUSIVE-OR gate 157 and the resultant applied to and stored in the locator word generator 152. The character $S_0$ is also circulated via AND gate 170 and OR gate 172 and stored back in the error pattern word storage unit 158. The contents of the locator word generator at this time is $\beta^{1r}S_1+S_0$ while, of course, the contents of the error pattern word storage unit 158 is $S_0$. The clock 148 then applies a low to lead A, and a high to lead C, (and therefore a low to lead C') and $l$ shift pulses to leads $t_1$ and $t_2$ and to AND gate 151 thereby causing the contents of the locator word generator to be applied to and stored in the error pattern word storage unit 158 and reapplied and stored in the locator word generator 152. The clock 148 now makes lead C low and applies $v-u$ shift pulses to lead $t_1$ thereby causing $v-u$ internal shifts of the contents of the locator word generator 152. After this shifting, the contents of the generator 152 are $(S_0+\beta^rS_1)\beta^{l(r1u)}$. The operation of the system hereafter depends on the value of $k$ which is established when the initial choice of the code to be utilized is made.

If $k=2$, the contents of the locator word generator, which is $$e_u=\left[\sum_{j=1}^{2^{k-1}-1} B^{(2j-1)u-2jv}\right](B^vS_0+S_1)$$

$$=B^{u-2v}\ (B^vS_0+S_1)$$

$$=B^{-(v-u)}\ (S_0+B^{-v}S_1)$$

is applied to the EXCLUSIVE-OR gate 160 via AND gate 163 and OR gate 161 as the $u^{th}$ character emerges from the shift register 140 thereby correcting the erasure in the position $u$. To correct the erasure in the position $v$, $S_0$ is applied by the buffer 159 to the error pattern word storage unit 158. The clock 148 then applies a high to leads A and C and $l$ shift pulses to $t_1$ and $t_2$ thereby causing the contents of the locator word generator —$e_u$—to be added to the contents of the error pattern word storage —$S_0$ —by the EXCLUSIVE-OR gate 157. The resultant is stored in the locator word generator 152 and then applied via AND gate 163 and OR gate 161 to the EXCLUSIVE-OR gate 160 as the $v^{th}$ character is emerging from the shift register 140. The $v^{th}$ character is thus corrected and applied to the data utilization circuit 166.

If $k>2$, the clock 148 applies a low to leads A and C (and thus a high on lead C') and $2(v-u)$ shift pulses to lead $t_1$ thereby causing generation of the quantity $(S_0+\beta^rS_1)\ \beta^{13(r1u)}$ in the locator word generator 152. The clock 148 then applies a high to lead A, a low to lead C and a high to lead C' and $l$ shift pulses to leads $t_1$ and $t_2$ causing addition of the contents of the locator word generator 152 and the error pattern word storage unit 152. The resultant is stored in the locator word generator 152. The contents of the locator word generator is now $(S_0+\beta^rS_1)\ (\beta^{13(r1u)}+1)$ and the contents of the error pattern word storage unit is still $S_0+\beta^{1r}S_1$. At this stage of the operation, if the prior two shifting and addition steps have been traversed less than $2^{k11}-a2$ times then the steps are repeated. If, on the other hand, the prior two steps have been traversed $2^{k11}-a2$ times then the contents of the locator word generator 152, which at this stage is $e_u$, is applied via AND gate 163 and OR gate 161 to the EXCLUSIVE-OR gate 160 as the $u^{th}$ character is emerging from the shift register 140. The resultant is applied to the data utilization circuit 166. The contents of the locator word generator 152 is then added to $S_0$ (as described previously) and the resultant applied to the EXCLUSIVE-OR gate 160 as the $v^{th}$ character emerges from the shift register 140 thereby correcting the erasure in position $v$. After any erasures have been corrected, $S_1$ is reapplied by the buffer 154 to the locator word generator 152 in preparation for generation of the next locator and error pattern words. In the manner generally described above, double character erasures can be corrected.

Including the interleaving circuit 134 and the deinterleaving circuit 138 in the system of FIG. 1 gives a burst-erasure correction system utilizing the principles of the present invention. Interleaving of any degree may be employed depending upon the erasure correcting capability desired.

Figure 2:
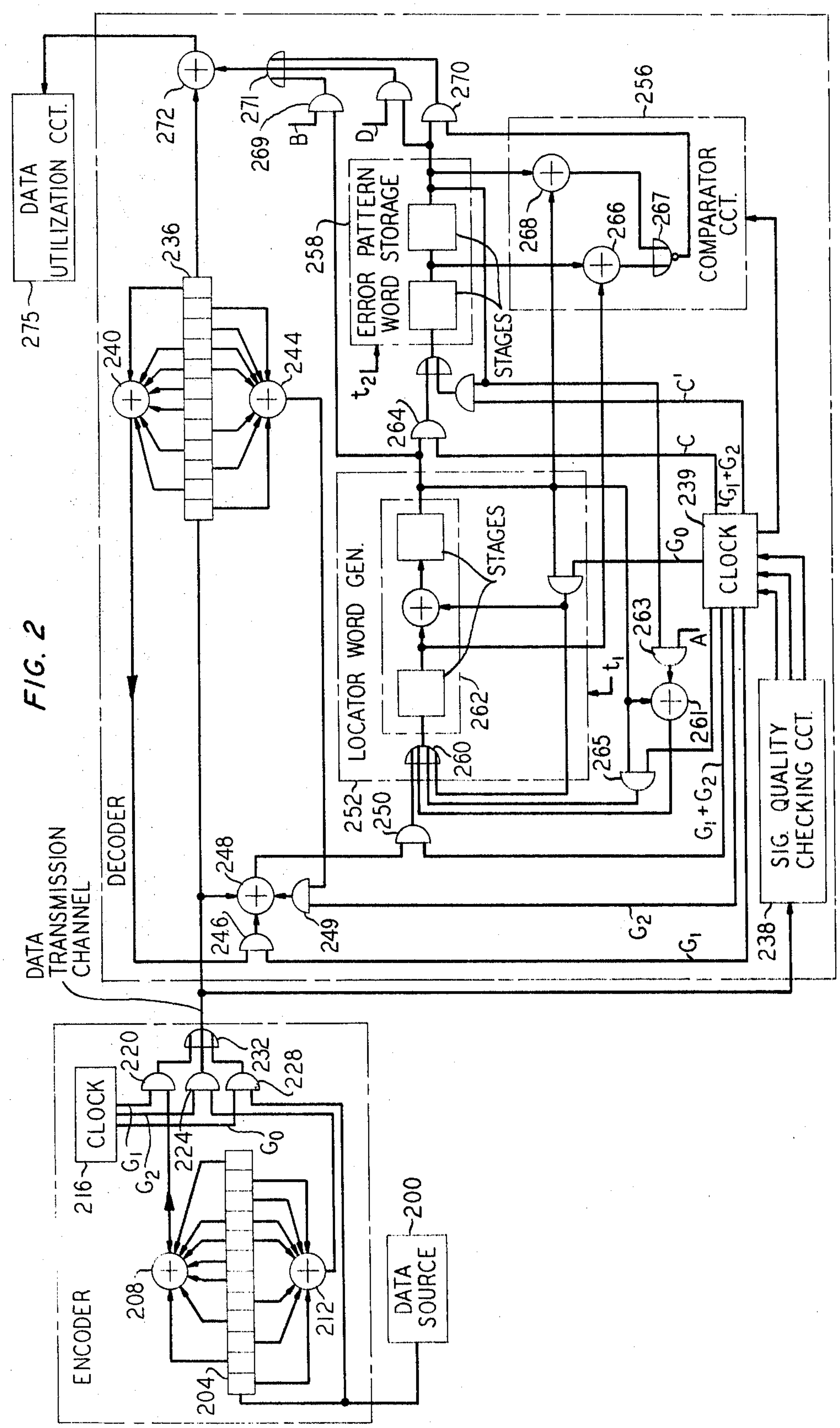
FIG. 2 shows a specific illustrative double erasure correcting system which utilizes a convolution code having 2-bit characters and a rate of three-fourths.

FIG. 2 shows a specific embodiment of a system for correcting double character erasures wherein each character comprises two bits. The code utilized in the system of FIG. 2 is the same as that utilized in a specific embodiment described in the prior Tong application and will be briefly reviewed here. As mentioned, the characters each comprise two bits and therefore $l=2$ so that the rate of the code can be as high as $R=2^{211}/2^2=3/4$ which is the rate used in this example. The irreducible polynomial chosen to derive the code is $G(X)=1+X+X^2$.

Since $l$ is equal to two in this case, $k$ also equals two and the primitive root of the irreducible polynomial is $\alpha=\beta$. Letting $X=\beta$, the following is obtained:

$G(\beta)=+\beta+^2$ or $\beta^2=1+\beta$

Figure 3A:
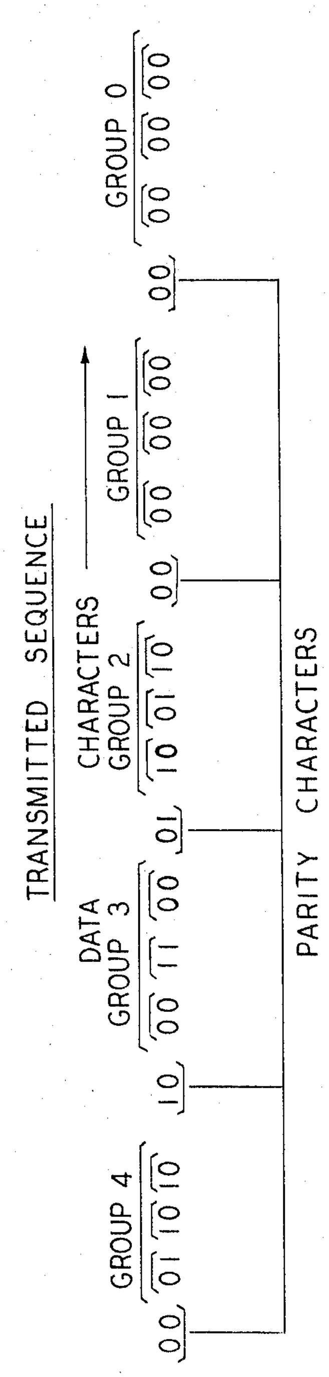

Using the natural 2-triple representation of the powers of $\beta$, the following is obtained:

$\beta^0=1\quad=10$
$\beta^1=\alpha\quad=01$
$\beta^2=1+\beta\quad=11$
$\beta^3=\beta.\beta^2=\beta+^2=\beta=10$ Now consider the data character groups 2 and 3 of FIG. 3A. Applying equation (1) derived earlier to these characters and noting that $b=2^1=4$, the parity check character may be obtained as follows. From equation (1), $x_{2b11}=x_0+\beta x_1+\ldots+\beta^{b12}x_{b12}+x_b\mathrm{aZ}\ldots+x_{2b12}$ or $x_7=_0+\beta x_1+\beta^2x_2+x_4+x_5\mathrm{aZ}x_6$.

Substituting in the particular data characters from groups 2 and 3 of FIG. 3A (reading the data from right to left) and noting that $(10)=\beta^0$ and $(01)=\beta$, the following is obtained $$x_7=\underbrace{01+\beta(10)+\beta^2(01)}_{\text{group 2}}+\underbrace{00+11+00}_{\text{group 3}}$$

or $x_7=+\beta.\beta^0+\beta^2.\beta+\beta a2$
$=\beta+\beta+\beta^3+\beta^2$
$=01+01+10+11=01.$ The first bit of the parity character $x_7$ which would be transmitted would be the 0 bit followed by the 1 bit. In FIG. 3A, this parity character is shown between groups 3 and 4. The other parity characters may be obtained in a similar fashion.

The encoder shown in FIG. 2 comprises a 12-bit or six-character shift register 204, the various stages of which are connected to two EXCLUSIVE-OR gates 208 and 212. Gates 208 and 212 generate the first and second bits respectively of the parity check characters. As a group of three characters are being applied from a data source 200 to the shift register 204, an AND gate 228 is enabled by a clock 216 thus transferring the three characters onto a data transmission channel. Thereafter, a parity check character is generated by the EXCLUSIVE-OR gates 212 and 208 by adding (modulo 2) selected portions of the contents of the shift register 204. The contents at this particular stage consist of the three characters mentioned above in the leftmost portion of the register and the three previously-received characters in the rightmost portion. The AND gate 220 would first be enabled by the clock 216, followed by enabling of the AND gate 224, to transfer the first and second bits respectively of the parity character onto the data channel. Thus assuming that data character groups 2 and 3 of FIG. 3A are registered in the shift register 204 (data group 2 being in the rightmost portion), it can be seen that the parity character 10 would be generated as shown in FIG. 3A. Thereafter, data group 2 would be shifted out of the shift register 204, data group 3 would be shifted from the left portion to the right portion of the register and data group 4 would be applied to and registered in the left portion of the register.

Figure 3B:
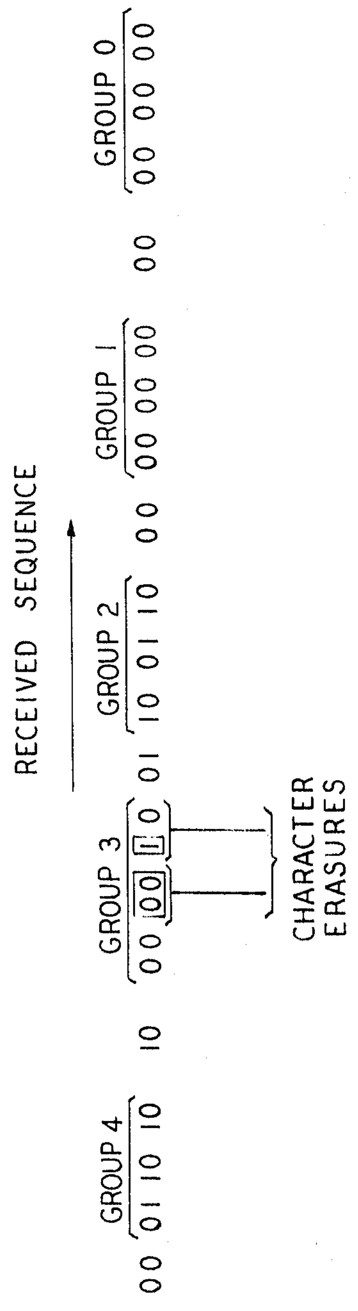

Now assume that of the transmitted sequence shown in FIG. 3A the second bit of the first data character of group 3 (or, in out terminology, the $u=0$ data character) and both bits of the second data character (or the $v=1$ data character) are received in error, i.e., that the bit of the $u=0$ character is changed from 0 to 1 and that the bits of the $v=1$ character are changed from 11 to 00, as shown in FIG. 3B. Also assume that such errors would be detected as erasures by a signal quality checking circuit 238 of FIG. 2. The various stages of the decoding of the received sequence will now be discussed with reference to FIG. 3C.

In particular, upon receiving and registering data group 1 in a shift register 236 of the decoder, group 0 having been previously received and registered, the locator word and error pattern word, both 00, are generated. This is shown in FIG. 3C in the first row of the table. The next stage of the decoding process as indicated in row 2 of FIG. 3C is the receipt and registration of group 2 in the shift register 236. Again the locator word and the error pattern word are generated and again both are 00. Group 3 is then received and registered in the left-half of the shift register 236 while group 2 is shifted to the right-half and thereafter the locator word and error pattern word are generated, the locator word being 01 and the error pattern word being 00 as indicated in row 3 of FIG. 3C. Upon receipt of group 4 and the shifting of group 3 to the right portion of the shift register 236, the locator word 11 is generated and the previous locator word 01 is shifted into the error pattern word storage 258 to become the new error pattern word. In addition, the signal quality checking circuit 238 signals a clock 239 of the existence of erasures in the $u=0$ and $v=1$ character positions. In response to this, the clock 239 applies $v=1$ shift pulses to lead $t_1$ and a high to lead $G_0$ of the locator word generator 252 thereby causing generation of the word 10 in the locator word generator. This is indicated in row 5 of FIG. 3C. The contents of the error pattern word storage 258 remains 01. The clock 239 then applies $l=2$ shift pulses to leads $t_1$ and $t_2$, a low to lead $G_0$, and a high to leads A and C′ (and thus a low to lead C) thereby causing addition of the contents of the error pattern word storage unit 258 and the locator word generator 252, the resultant being stored in the locator word generator. The contents of the locator word generator and the error pattern word storage unit at this stage are 11 and 01 respectively as indicated in row 6 of FIG. 3C. The clock 239 now applies a low to lead A, a high to lead $G_0$ and $v-u=1$ shift pulses to lead $t_1$. This results in the word or character 10 being generated in the locator word generator 252. Addition of this character (modulo 2) to the $u=1$ character of group 3 which is stored in the shift register 236 gives a resultant of 00 which was the true $0^{th}$ character originally transmitted. This addition is effected by the clock 239 making lead B high and pulsing lead $t_1$ twice thereby causing the character 10 in the locator word generator 252 to be applied via AND gate 269 and OR gate 271 to EXCLUSIVE-OR gate 272 just as the $0^{th}$ character emerges from the shift register 236. The corrected character is then applied to a data utilization circuit 275. While the addition of the contents of the locator word generator to the $0^{th}$ character is taking place, the contents are reregistered via AND gate 265 in the locator word generator. To correct the character erasure in the $v=1$ position, the contents of the locator word generator, i.e., the character 10, is added to the contents of the error pattern word storage unit, i.e., the character 01, to obtain the character 11 which is then applied to the EXCLUSIVE-OR gate 272 as the $v^{th}$ character is emerging from the shift register 236. Adding the character 11 to the $v^{th}$ character 00 registered in the shift register 236 gives a resultant character of 11 which was the true character originally transmitted with group 3. Since all erasures have now been corrected, the remaining characters in the register 236 are simply applied unaltered to the data utilization circuit 275. In the manner described above, double character erasures may be corrected.

As indicated earlier, if a single erasure is detected it may be advisable to utilize the single character error correcting circuitry (including the comparator circuit 256) for the correction of the erasure. Such correction would be carried out as described in the aforecited Tong application.

In summary, systems have been disclosed for utilizing convolution or recurrent codes for double-character erasure correction and for burst-erasure correction. The double-character erasure correcting scheme provides for correcting two or fewer character erasures in any $2^l$-character block provided the subsequent block is error free where $l$ is the number of bits in each character and the rate of the code utilized is up to $2^k-1/2^k$ where $2^l-1$ is an even multiple of $2^k-1$. By appropriate interleaving, the convolution codes can be used for burst-erasure correction.

Specific detailed circuit configurations for the clock 148 and the clock 239 of FIGS. 1 and 2 respectfully, are not given since their construction is considered obvious to one skilled in the art in view of the present disclosure.

Finally, it is to be understood that the above described arrangements are only illustrative of the application of the principles of the present invention. Numerous other modifications and alternative arrangements may be devised by those skilled in the art without departing from the spirit and scope of the invention.

I claim:

1. In a data transmission system comprising a source of information characters of $l$-bit length and an encoding means responsive to said information source and connected to one end of a data transmission channel for encoding said information characters in a convolution code comprising $l$-bit length characters and having a rate of $2^k-1/2^k$ where $2^l-1$ is an even multiple of $2^k-1$, decoding means connected to the other end of said data transmission channel comprising signal quality means responsive to said encoded information characters for checking the analog nature thereof and for indicating the occurrence of any single-or double-character erasures in each $2l$-character block thereof, means for correcting single character erasures occurring in any $2l$-character block, and means for correcting double-character erasures in a $2l$-character block provided that the subsequently received block does not contain an error.

2. In a data precessing system comprising:

a source of information characters of $l$-bit length;

means responsive to said source for generating parity characters from said information characters in accordance with a convolution code having a rate up to $2^k-1/2^k$ where $2^l-1$ is an even multiple of $2^k-1$, said code being generated by a generator polynomial having a primitive root $\beta$;

means for applying said information characters and said parity characters to one end of a communication channel;

means connected to the other end of said channel for receiving and registering said information characters;

signal quality checking means for determining character erasures of the received information and parity characters;

means for generating an error pattern word $S_0$ from said received information and parity characters; and means for adding the error pattern word $S_0$ to a received character upon determination by said signal quality checking means that said character is a character erasure.

3. A system as in claim 2 further comprising:

means for generating a locator word $S_1$ from said received information and parity characters;

means for generating a data character $\beta^{1u}S_1$ upon determination by said signal quality checking means that character erasures have occurred in character positions $u$ and $v$, where $u \leq 2^l-2$ and $v=2^l-1$ of the 2 received characters being processed; and means for adding said data character to said character in position $u$.

4. A system as in claim 3 further comprising, means for generating the character $$e_u=\left[\sum_{j=1}^{2^{k-1}-1} \beta^{(2j-1)u-2jv}\right](\beta^v S_0+S_1)$$

and the character $e_r = e_u + S_0$ upon determination by said signal quality checking means that character erasures have occurred in character positions $u < v \leq 2^l - 2$ of the 2 received characters being processed; and means for adding said characters $e_u$ and $e_r$ to said characters in positions $u$ and $v$ respectively.

5. A system as in claim 4 further comprising:

means connected to said parity character generating means for interleaving said information and parity characters prior to application to said communication channel; and means connected to the other end of said channel and to said registering means for separating said interleaved characters into their initial groupings prior to registering the characters in said registering means.

6. A data communication system including a source of information, an encoding means responsive to said source for encoding said information in a convolution code which comprises up to $2^k - 1$ data characters of length $l$ bits for every $l$-bit parity check character, where $2l - 1$ is an even multiple of $2^k - 1$, means for applying said characters to one end of a communication channel, registering means connected to the other end of said channel for registering said data characters received from said channel, means connected to said registering means and said channel for generating partial syndromes $S_0$ and $S_1$ from the data characters stored in said registering means and from parity characters received from said channel, and means for adding said partial syndrome $S_0$ to one of said registered data characters when said partial syndrome $S_1$ indicates said data character is in error thereby correcting said erroneous character, wherein the improvement comprises:

signal quality checking means connected to said channel for determining character erasures in said received characters; and means, including said means for generating partial syndromes, responsive to said signal quality checking means for correcting two or less character erasures in any block of $2^l$ received characters provided the previous $2^l$-character block is error free.

7. A system as in claim 6 wherein said partial syndrome generating means comprises a feedback shift register for generating and registering said partial syndrome $S_1$ and a shift register for registering the previously generated partial syndrome $S_1$, said previously generated partial syndrome $S_1$ comprising the current partial syndrome $S_0$, and wherein said character erasure correcting means comprises means for shifting in said feedback shift register the contents thereof $u$ times upon determination by said signal quality checking means that erasures have occurred in positions $0 \leq u \leq 2^l - 2$ and $v = 2^l - 1$ of a $2^l$-character block, and means for adding said contents to the character in said position $u$ to thereby correct the erasure in said position.

8. A system as in claim 7 wherein said convolution code is chosen such that $k = 2$ and wherein said character erasure correcting means further comprises:

means for shifting in said feedback shift register the contents thereof $v$ times upon determination by said signal quality checking means that erasures have occurred in positions $u$ and $v$, where:

$0 \leq u < v \leq 2^l - 2$ of a $2^l$-character block;

means for adding the contents of said feedback shift register to the contents of said shift register and for storing the resultant thereof in said feedback shift register, the prior contents of said shift register being retained therein;

means for shifting the contents of said feedback shift register $v - u$ times, means for adding the contents of said feedback shift register to the character in said position $u$ to thereby correct the erasure in said position; and means for causing the addition of the contents of said feedback shift register and said shift register and the addition of the resultant thereof with the character in said position $v$ to thereby correct the erasure in said position.

9. A system as in claim 7 wherein said convolution code is chosen such that $k > 2$ and wherein said character erasure correcting means further comprises:

buffer storage means connected to said shift register for temporarily storing the contents of said shift register;

means for shifting in said feedback shift register the contents thereof $v$ times upon determination by said signal quality checking means that erasures have occurred in positions $u$ and $v$, where:

$o < U < V < 2^l - 2$ of a $2^l$-character block;

means for adding the contents of the feedback shift register to the contents of said shift register and for storing the resultant thereof in said feedback shift register and said shift register;

means for shifting in said feedback shift register the contents thereof $3(v - u)$ times;

means for adding the contents of the feedback shift register to the contents of the shift register and for storing the resultant thereof in said feedback shift register;

means for activating the immediately prior shifting and adding means causing said shifting and adding to occur $2^{k11}\alpha\zeta^3$ times;

means for adding the contents of said feedback shift register to the character in said position $u$ to thereby correct the erasure in said position $u$;

means for adding the contents of said buffer register to the contents of said feedback shift register and for storing the resultant thereof in said feedback shift register, and means for adding the contents of said feedback shift register to the character in said position $v$ to thereby correct the erasure in said position.

10. In a data communication system, a machine-implemented method, carried out by means of a decoding apparatus, for decoding $l$-bit data characters transmitted over a noisy communication channel, said characters being encoded in a convolution code of rate up to $2^k - 1/2^k$ where $2^l - 1$ is an even multiple of $2^k - 1$, said code being generated by a generator polynomial having a primitive root $\beta$, comprising the steps of processing by means of said apparatus two $2^l$-character blocks of said data characters to obtain two partial syndromes $S_0$ and $S_1$;

processing by means of said apparatus said data characters by performing an analog signal quality checking operation thereon to determine character erasures; and adding by means of said apparatus the partial syndrome $S_0$ to the character in position $u < 2^l$ of the data characters being processed upon determination that an erasure has occurred in position $u$ thereby correcting said erasure.

11. A method as in claim 10 further including the steps of generating the character $\beta^{1u} S_1$ upon a determination that erasures have occurred in positions $u \leq 2^l - 2$ and $v = 2^l - 1$ of the data characters being processed; and adding said generated character to the character in position $u$ thereby correcting the erasure in said position.

12. A method as in claim 11 further including the steps of generating the characters $e_u$ and $e_r$, where:

$$e_u = \left[ \sum_{j=1}^{2^{k-1}-1} B^{(2j-1)u-2jv} \right] (B^v S_0 + S_1)$$

and $e_v = S_0 + e_u$ upon a determination that erasures have occurred in positions $u$ and $v$, where $u < v \leq 2^l - 2$ of the data characters being processed; and adding said characters $e_u$ and $e_v$ to the characters in positions $u$ and $v$ respectively thereby correcting the erasures in said positions.